(12) United States Patent
Ramasamy

(10) Patent No.: US 10,309,789 B2
(45) Date of Patent: Jun. 4, 2019

(54) AUTOMATED LANE ASSIGNMENT FOR VEHICLES

(71) Applicant: QUALCOMM Incorporated, San Diego, CA (US)

(72) Inventor: Bala Ramasamy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 15/081,665

(22) Filed: Mar. 25, 2016

(65) Prior Publication Data

US 2017/0276492 A1 Sep. 28, 2017

(51) Int. Cl.
| | |
|---|---|
| G08G 1/00 | (2006.01) |
| G08G 1/01 | (2006.01) |
| G08G 1/16 | (2006.01) |
| G01C 21/34 | (2006.01) |
| B60W 40/04 | (2006.01) |
| G08G 1/0967 | (2006.01) |

(52) U.S. Cl.
CPC ............. *G01C 21/34* (2013.01); *B60W 40/04* (2013.01); *G08G 1/0112* (2013.01); *G08G 1/0145* (2013.01); *G08G 1/096725* (2013.01); *G08G 1/096758* (2013.01); *G08G 1/096775* (2013.01); *G08G 1/164* (2013.01); *G08G 1/167* (2013.01)

(58) Field of Classification Search
CPC .......... G01C 21/34; G08G 1/22; G08G 1/167; G08G 1/164; G08G 1/0112; G08G 1/0145; G08G 1/017; B60W 40/04
See application file for complete search history.

(56) References Cited

U.S. PATENT DOCUMENTS

| | | |
|---|---|---|
| 7,979,173 B2 | 7/2011 | Breed |
| 9,127,956 B2 | 9/2015 | Einecke et al. |
| 9,400,187 B2 | 7/2016 | Lee |

(Continued)

FOREIGN PATENT DOCUMENTS

DE 102011119208 A1 5/2013

OTHER PUBLICATIONS

Ramaswamy, Deepa, et al. "Lane assignment on automated highway systems." IEEE Transactions on Vehicular Technology46.3 ( 1997): 755-769. (Year: 1997).*

(Continued)

*Primary Examiner* — Alan D Hutchinson
(74) *Attorney, Agent, or Firm* — Kilpatrick Townsend & Stockton, LLP

(57) ABSTRACT

Methods, systems, computer-readable media, and apparatuses for automated lane assignment for vehicles are presented. One example method includes the steps of accessing vehicle information of at least one vehicle, the vehicle information including a priority level of a plurality of priority levels associated with each of the at least one vehicle; accessing lane information associated with a road, the lane information comprising information corresponding to at least two lanes of travel in a direction; and assigning at least one of the at least one vehicle to a lane of travel on the road based at least in part on the vehicle information and the lane information. Another example method further includes the step of accessing second vehicle information of a second vehicle, wherein assigning the first vehicle to the lane of travel is further based on the second vehicle information.

30 Claims, 6 Drawing Sheets

(56) References Cited

U.S. PATENT DOCUMENTS

| | | |
|---|---|---|
| 9,547,986 B1 | 1/2017 | Curlander et al. |
| 2008/0275635 A1 | 11/2008 | Jung |
| 2012/0095671 A1 | 4/2012 | Matsumura et al. |
| 2013/0184926 A1 | 7/2013 | Spero et al. |
| 2015/0284009 A1 | 10/2015 | Cullinane et al. |
| 2015/0321699 A1 | 11/2015 | Rebhan et al. |
| 2017/0082452 A1 | 3/2017 | Sumizawa |

OTHER PUBLICATIONS

Dao, Thanh-Son, Christopher Michael Clark, and Jan Paul Huissoon. "Optimized lane assignment using inter-vehicle communication." Intelligent Vehicles Symposium, 2007 IEEE. IEEE, 2007. (Year: 2007).*

Roncoli, Claudio, Markos Papageorgiou, and Ioannis Papamichail. "Traffic flow optimisation in presence of vehicle automation and communication systems—Part II: Optimal control for multi-lane motorways." Transportation Research Part C: Emerging Technologies 57 (2015): 260-275. (Year: 2015).*

Ioannou, Petros, Yun Wang, and Hwan Chang. Integrated roadway/adaptive cruise control system: Safety, performance, environmental and near term deployment considerations. California PATH Program, Institute of Transportation Studies, University of California at Berkeley, 2007. (Year: 2007).*

Varaiya, Pravin. "Smart cars on smart roads: problems of control." IEEE Transactions on automatic control 38.2 (1993): 195-207. (Year: 1993).*

Schakel, Wouter J., and Bart Van Arem. "Improving traffic flow efficiency by in-car advice on lane, speed, and headway." IEEE Transactions on Intelligent Transportation Systems 15.4 (2014): 1597-1606. (Year: 2014).*

Kesting, Arne, et al. "Adaptive cruise control design for active congestion avoidance." Transportation Research Part C: Emerging Technologies 16.6 (2008): 668-683. (Year: 2008).*

Iannelli, Nick; Self-driving cars could get their own lanes, Mar. 15, 2016 (Year: 2016).*

International Search Report and Written Opinion—PCT/US2017/016330—ISA/EPO—dated Dec. 6, 2017.

* cited by examiner

AUTOMATED LANE ASSIGNMENT FOR VEHICLES

BACKGROUND

Fully-autonomous self-driving cars can operate on a roadway with other self-driving cars, but absent additional information, may treat all vehicles on the road equally. However, there may be scenarios where some vehicles should be treated with a different priority than others. For example, self-driving cars may not properly respond to emergency vehicles, emergencies, characteristics of the car or driver, or different driving modes (e.g., autonomous, partially-autonomous, or manual). In some cases, a person may want to temporarily disengage self-driving, e.g., they enjoy driving on a particular sections of road. However, it may be difficult for the manually-driven car to operate safely while on the road with other vehicles that are being operated autonomously. For example, self-driving vehicles may operate with reduced space between vehicles because their actions are coordinated, and thus human reflexes may not be a limiting factor. However, if a car is manually operated, the driver may not be able to react fast enough, or the self-driving cars may not properly respond to actions taken by a manually-driven car.

BRIEF SUMMARY

Various examples are described for automated lane assignment for vehicles. For example, one disclosed method includes accessing vehicle information of at least one vehicle, the vehicle information including a priority level of a plurality of priority levels associated with each of the at least one vehicle; accessing lane information associated with a road, the lane information comprising information corresponding to at least two lanes of travel in a direction; and assigning at least one of the at least one vehicle to a lane of travel on the road based at least in part on the vehicle information and the lane information.

In another example, a disclosed system includes a non-transitory computer-readable medium; and a processor in communication with the non-transitory computer-readable medium and configured to execute program code stored in the non-transitory computer readable medium and to: access vehicle information of at least one vehicle, the vehicle information including a priority level of a plurality of priority levels associated with each of the at least one vehicle; access lane information associated with a road, the lane information comprising information corresponding to at least two lanes of travel in a direction; and assign at least one of the at least one vehicle to a lane of travel on the road based at least in part on the vehicle information and the lane information.

One example non-transitory computer readable medium comprises executable instructions configured to cause a processor to: access vehicle information of at least one vehicle, the vehicle information including a priority level of a plurality of priority levels associated with each of the at least one vehicle; access lane information associated with a road, the lane information comprising information corresponding to at least two lanes of travel in a direction; and assign at least one of the at least one vehicle to a lane of travel on the road based at least in part on the vehicle information and the lane information.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
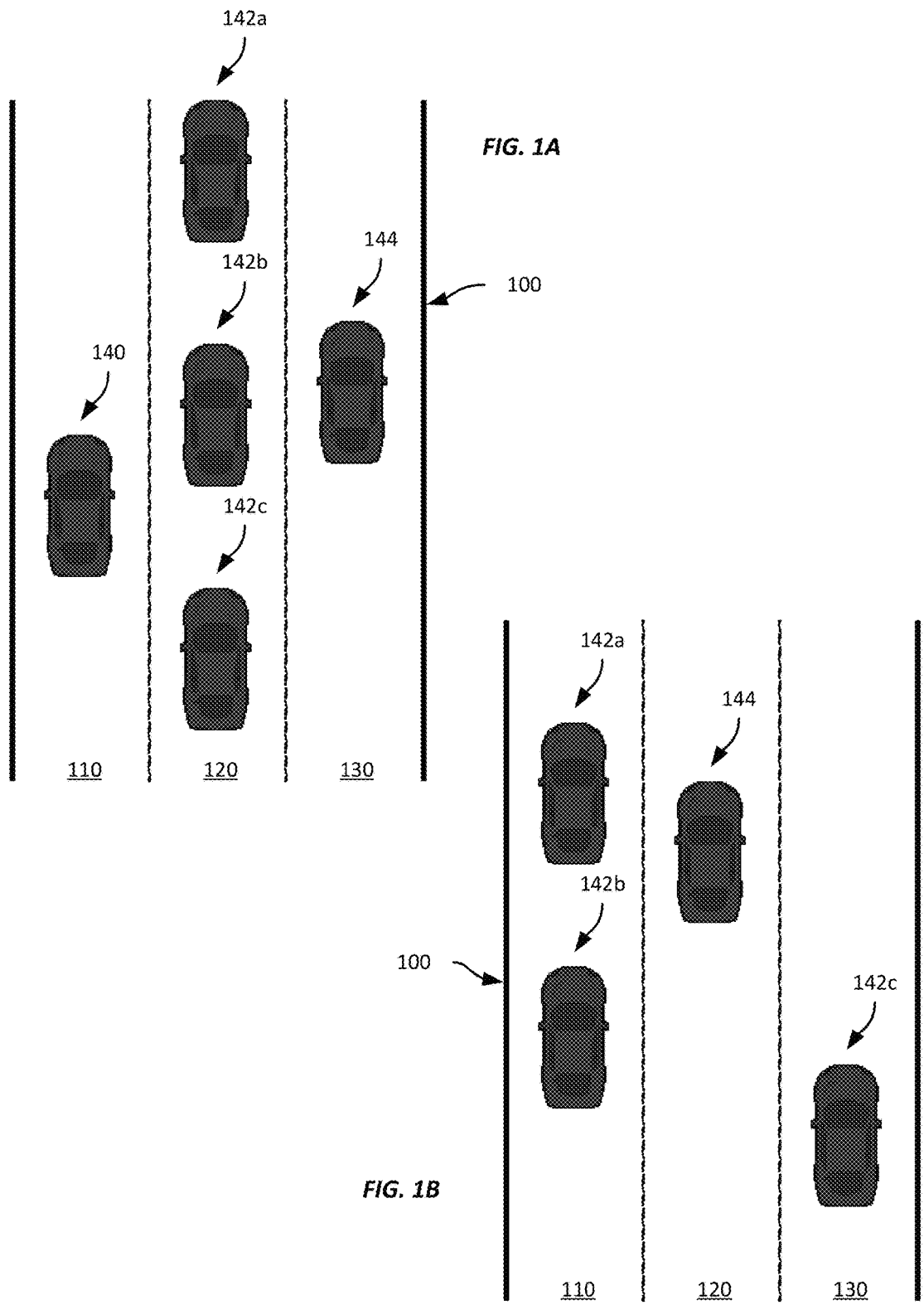
FIGS. 1A-1B show example road configurations for automated lane assignment for vehicles.

Examples are described herein in the context of automated lane assignment for vehicles. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Example of Automated Lane Assignment for Vehicles

While driving her car, the driver enables a fully-autonomous driving mode and the car navigates onto a road according to a predetermined route to a destination. As the car navigates along the road, it monitors its own status, e.g., the driving mode or the status of its brakes or tires, and receives information from other vehicles on the road, such as via vehicle-to-vehicle ("V2V"), vehicle-to-infrastructure ("V2I"), or vehicle-to-vehicle-by-LTE ("V2X") communication. Based on the user's vehicle's status, the status of other vehicles in the vicinity or that are approaching, user input, and/or other information, the user's vehicle determines its priority for travel along the road and assigns itself, or is assigned by another vehicle or device, to one of the lanes on the road based on its priority and the available lanes. At a later time, while on a curvy section of road in the mountains, the user enables a manual driving mode in the car, at which time, the car accesses information about the lanes on the road, the status of other cars on the road and their assigned lanes, and, after updating its priority, assigns a lane to the user's car to allow the user to safely use manual mode. The car may notify the user of the assigned lane, such as via a heads-up display. While driving along the curvy section of road, the user's vehicle receives information about an emergency vehicle having a high priority approaching from behind the vehicle. The user's vehicle determines that its priority is lower than the emergency vehicle's priority and assigns a new lane to itself and provides an indication to the user to either engage an autonomous driving mode or to manually change to the newly-assigned lane. After the emergency vehicle passes the user, the user's vehicle re-assigns the previous lane. Finally, the user re-engages an autonomous driving mode and, after again updating its priority, the vehicle assigns a new lane to the vehicle based on the change in driving mode, and changes to the new lane to resume autonomous driving.

This illustrative example is not intended to be in any way limiting, but instead is intended to provide an introduction to the subject matter of the present application. For example, the illustrative example above is described with respect to an autonomous car; however, the present application is not limited to such an environment, but may be used in any suitable environment. Other examples of autonomous vehicle lane assignment are described below.

Referring now to FIG. 1A, FIG. 1A illustrates a road 100 having several lanes 110-130 for travel in a particular direction. Several vehicles 140, 142a-c, and 144 are operating on the road in the various lanes. In this example, each of the vehicles 140, 142a-c, 144 has been assigned to a lane 110, 120, 130 based on information about the respective vehicle. For example, vehicle 140 has been assigned to lane 110 because the vehicle 140 is a police car that is responding to an emergency. Vehicles 142a-c have been assigned to middle lane 120 because they are each operating at a medium priority. In this case, the vehicles 142a-c determined their respective priorities based on their respective driving modes, e.g., an autonomous driving mode, and their respective destinations. For example, the operators of the vehicles 142a-c have indicated that they are each commuting to work, and so the vehicle 142a-c determines that it is operating in a medium priority, which is above a priority assigned to vehicles travelling for a non-commercial reason, but below a priority assigned to official vehicles responding to emergencies, e.g., ambulances with lights and sirens engaged. In addition, vehicle 144 has been assigned to lane 130 because it is operating at a low priority as the operator as indicated that he is on a scenic drive while in a manual driving mode.

Referring now to FIG. 1B, the police car, vehicle 140, has progressed beyond the group of vehicles 142a-c, 144 shown in FIG. 1A, and so the left lane 110 is available again for other, lower-priority traffic. Consequently, vehicles 142a-b operating at a medium priority level are re-assigned to the leftmost lane 110 to allow unobstructed travel along the road. Further, in this example, the vehicles 142a-c are operating in an autonomous mode. In such a configuration, with each vehicle 142a-b operating in an autonomous mode, the vehicles 142a-b are able to operate at higher speeds and with smaller gaps between the vehicles 142a-c than would be safe for vehicles manually operated by their respective drivers. Vehicle 144, which is operated at a low priority, is re-assigned to the middle lane 120. Vehicles in low priority mode are operated in the middle lane 120 in this example as they are able to travel without needing to react to cars entering and exiting the road 100, and are not obstructing higher priority vehicles. Finally, vehicle 142c has been re-assigned to lane 130 as the vehicle's navigation system has determined that the vehicle 142c needs to exit the road 100 shortly due to an upcoming turn based on a pre-programmed navigational route. Thus, its priority has been reassigned with respect to a specific lane, e.g., the right-most lane, as it needs to exit the road, but retains its generalized medium priority based on its continued travel towards the operator's workplace.

Figure 2:
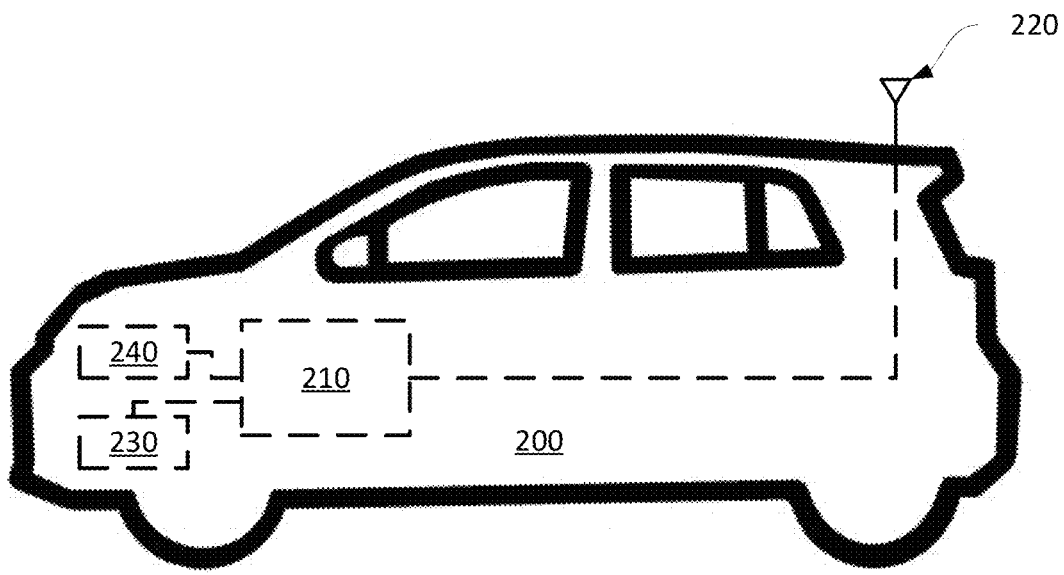
FIGS. 2-4 show example devices and systems for automated lane assignment for vehicles.

Referring now to FIG. 2, FIG. 2 shows an example system for automated lane assignment for vehicles. In the example shown in FIG. 2, a vehicle 200 has been equipped with a computing device 210 in communication with an antenna 220 and one or more sensors 230, 240. The computing device 210 is configured to receive radio signals from the antenna 220, and in some examples, may be configured to transmit radio signals using the antenna 220. For example, the computing device 210 may be configured to transmit signals that may be employed by other suitable computing devices, such as may be affixed to other vehicles, or a lane assignment system according to different examples for automated lane assignment for vehicles. Such signals may include information such as a priority level of the vehicle 200, a driving mode of the vehicle 200, an identifier for the vehicle 200 or computing device 210, one or more dimensions of the vehicle 200, a lane of travel of the vehicle 200, a speed of the vehicle 200, a heading of the vehicle 200, or other vehicle information. In addition, the computing device 210 can receive signals from a lane assignment server or other vehicles. Signals from a lane assignment server may include a lane assignment, a request for vehicle information, a request for vehicle status, a request for a current lane assignment, or request for other information, while signals from another vehicle may include vehicle information for the other vehicle, a lane assignment for the other vehicle, or a request from the other vehicle for vehicle information. It should be noted that the locations of the computing device 210 and the antenna 220 are merely examples, and in other examples, any suitable location within the vehicle 200 or other vehicle may be used.

As shown in FIG. 2, the vehicle 200 may be equipped with one or more sensors 230, 240 of the same or different types. For example, sensors 230 may comprise optical sensors or electromagnetic sensors. One or much such sensors may be configured to detect lane markers, such as indicators (e.g., stripes) painted on the road surface, or material embedded within the road surface, such as ferromagnetic materials, which may provide information to the computing device 210 that may be used to maintain a lane of travel, e.g., based on detections of lane boundaries, or change lanes. In some examples, sensors 240 may comprise proximity sensors configured to detect other vehicles. Example sensors may include image sensors, ultrasound range sensors, laser range sensors, radar, or other suitable proximity sensors. One or more sensors 230, 240 may be affixed to the vehicle, such as on the front, sides, and rear of the vehicle. In some examples, an omnidirectional sensor may be affixed to the roof of the vehicle.

The computing device 210 may further function as, or being communication with, a navigation system of the vehicle 200. The computing device 210 may be configured in some examples to access navigation information, such as preprogrammed route information or location information that may be employed for autonomous vehicle lane assignment.

Figure 3:
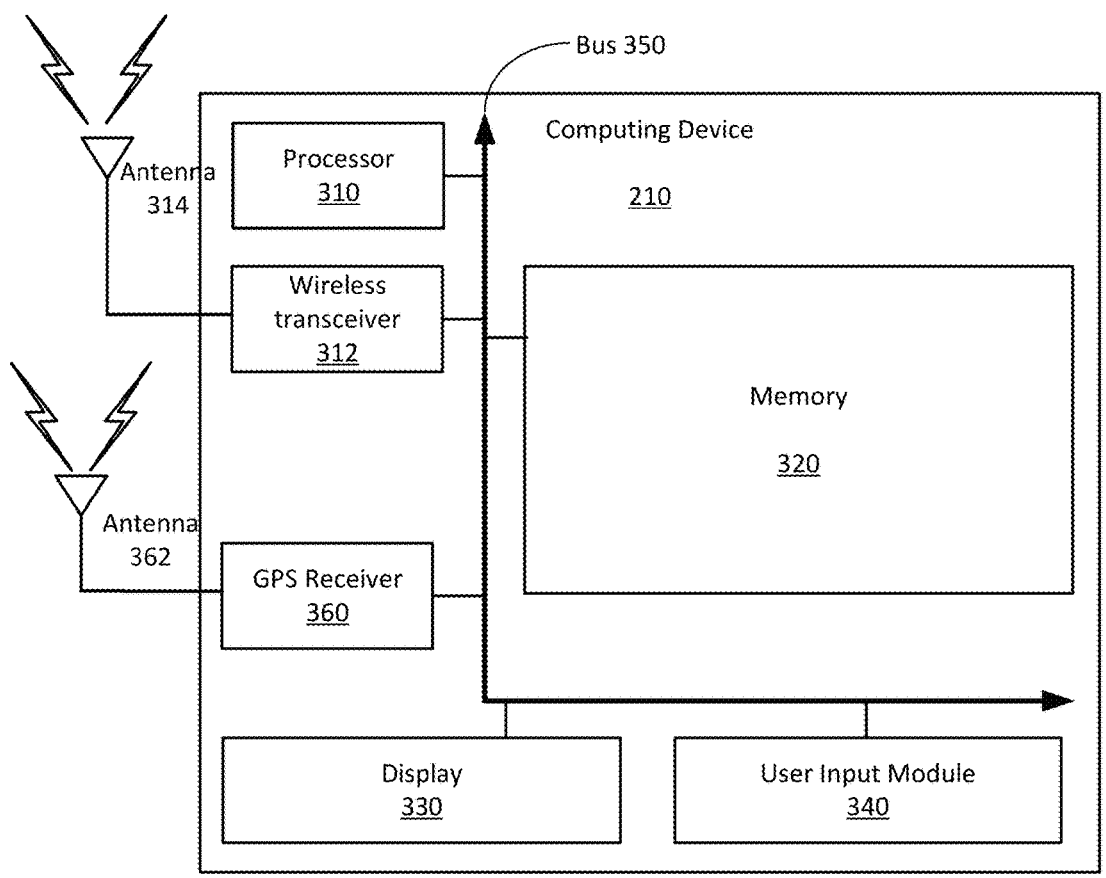

FIG. 3 shows a more detailed view of the example computing device 210 shown in FIG. 2. In the example shown in FIG. 3, the mobile device includes a processor 310, a memory 320, a wireless transceiver 312, a Global Navigation Satellite System ("GNSS") receiver 360, e.g., Global Positioning System ("GPS"), and antenna 362, a display 330, a user input module 340, and a bus 350. In this example, the computing device 210 comprises a vehicle-based navigation system, but may be any suitable device, include an embedded computing device, a cellular phone, a laptop computer, a tablet, a phablet, a personal digital assistant (PDA), wearable device, or augmented reality device. The processor 310 is configured to employ bus 350 to execute program code stored in memory 320, to output display signals to a display 330, and to receive input from the user input module 340. In addition, the processor 310 is configured to receive information from the GNSS receiver 360 and wireless transceiver 312 and to transmit information to the wireless transceiver 312.

The wireless transceiver 312 is configured to transmit and receive wireless signals via antenna 314. For example, the wireless transceiver may be configured to receive radio signals from a wireless AP or other suitable wireless signal transmitter. In some examples, the computing device 210 may comprise one or more additional wireless transceivers and associated antennas that may be configured to communicate with a cellular base station by transmitting signals to and receiving signals from an antenna associated with the cellular base station. The GNSS receiver 360 is configured to receive signals from one or more GNSS satellites and to provide location signals to the processor 310. It should be noted that all of the components shown in the computing device 210 are not required in various examples. For example, the GNSS receiver 360 and antenna 362 are optional as are the display 330, and user input module 340.

Figure 4:
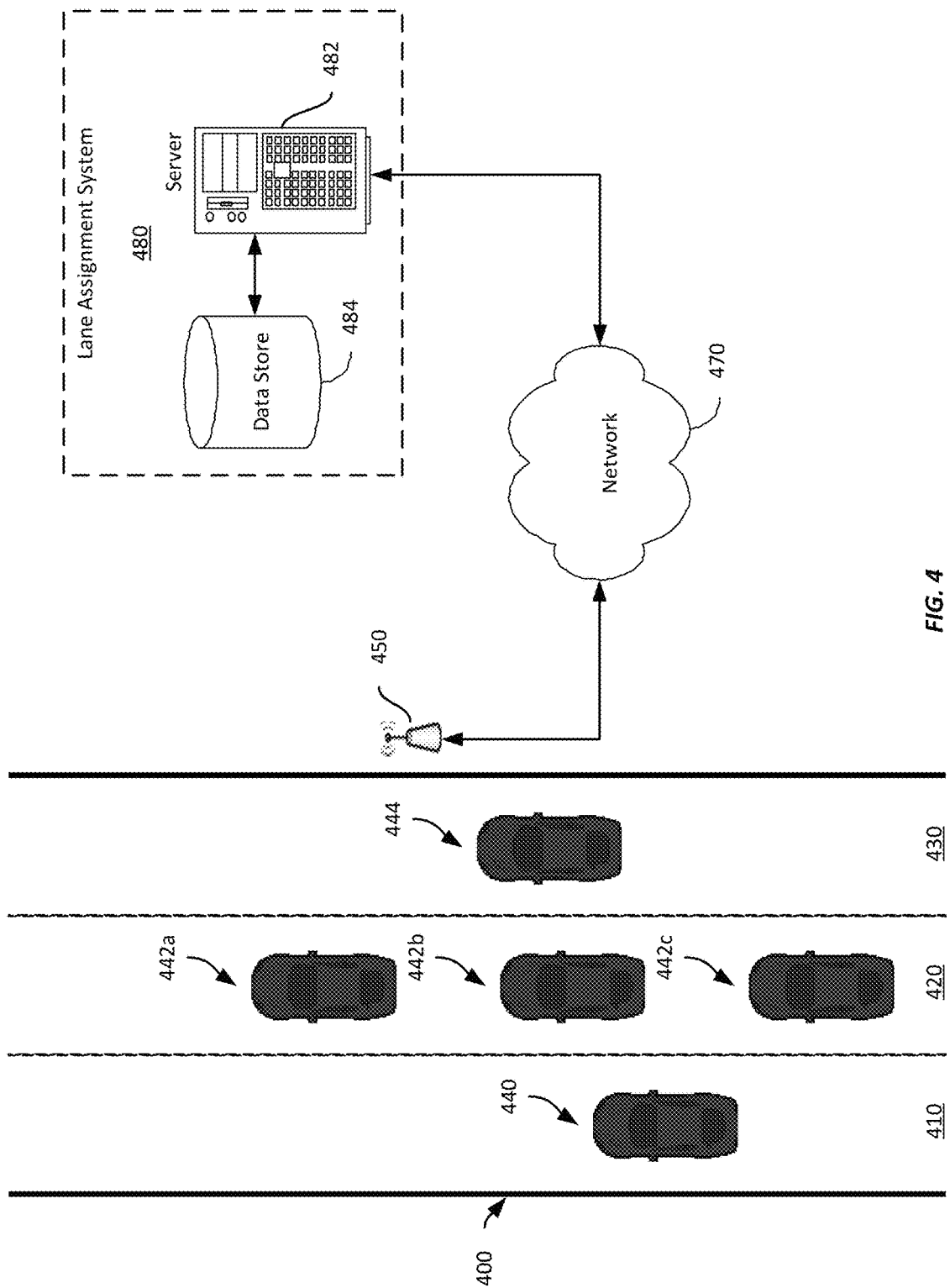

Referring now to FIG. 4, FIG. 4 shows an example lane assignment system 480 in communication with a plurality of vehicles 440, 442*a-c*, 444 via a network 470 in communication with a wireless communication node 450. The lane assignment system 480 includes at least one server 482 and at least one data store 484. The lane assignment system 480 may be configured to perform one or more methods according to this disclosure.

In the system shown in FIG. 4, suitable computing devices disposed within vehicles 440, 442*a-c*, 444 are in communication with the lane assignment system 480 via the wireless communication node 450, which may be a cellular antenna, wireless AP, or other wireless transceiver device. The wireless communication node 450 is configured to communicate with one or more of the vehicles 440, 442*a-e c*, 444, such as to provide a broadcast or point-to-point signal usable by one or more of the vehicles 440, 442*a-e c*, 444 for autonomous lane detection, and to receive signals from one or more of the vehicles 440, 442*a-e c*, 444 to provide information to the lane assignment system 480, or to receive information from the lane assignment system 480. For example, a vehicle may provide distance information measured between the vehicle and the wireless communication node 450, or it may request lane information associated with the road 400.

In some examples, a lane assignment system 480 may comprise a plurality of lane assignment servers, such as lane assignment server 482, or data stores, such as data store 484. For example, a lane assignment system 480 for a metropolitan area may comprise a large number of servers capable of managing a large number of roads and vehicles. Further, different lane assignment systems 480 may manage different types of roads, e.g., highways, city streets, residential neighborhoods, etc., or may have overlapping geographic responsibility. In some such examples, suitable lane assignment systems, such as the example shown in FIG. 4, may be configured to handoff vehicles that transition from a road or area managed by one system to a road or area managed by another system. Thus, the lane assignment system 480 may be integrated into a network of lane management systems in some examples. Further, one or more lane assignment systems may be part of a lane management system, which may provide lane management functionality in addition to lane assignment functionality.

In this example, the lane assignment system 480 maintains information about vehicles travelling on roads under the management of the lane assignment server 482. For purposes of this example, the lane assignment server 482 is configured to manage the road 400 shown in FIG. 4, however, it may also be configured to manage other roads as discussed above. The data store 484 maintains records associated with vehicles travelling on the road 400 managed by the lane assignment system 480. The vehicle records comprise a vehicle identifier ("ID"), a vehicle type, a vehicle priority generally (such as a police car) or for a specific trip, a vehicle driving mode, a location, and a direction of travel. In some examples, the records maintained by the data store 484 comprise other or additional information, such as a vehicle condition (e.g., normal, mechanical problem, student driver, number of passengers, etc.), destination information, route information, or time information (e.g., time at which the information was received or last updated). The lane assignment server 482 may access one or more records in the data store 484 to assign a vehicle to a lane on a road managed by the lane assignment system 480.

In addition to vehicle information, the data store 484 also maintains records associated with roads and lanes managed by the lane assignment system 480, such as the road 400 in FIG. 4. In this example, the lane records comprise a road name, a number of lanes per direction of travel, and, for each lane, a priority level, one or more features of the road (e.g., charging functionality, scenic views, high-occupancy vehicle restrictions, etc.), and/or one or more driving modes. For example, with respect to the road 400 in FIG. 4, the left lane 410 may be assigned an "autonomous" mode, the middle lane 420 may be assigned a "manual" mode, and the right lane 430 may be assigned to an "autonomous" mode and a "manual" mode. Other combinations of driving modes may be employed in other examples, and may include other types of driving modes.

This disclosure refers to vehicle priority, or priority, which relates to a vehicles priority with respect to other vehicles travelling on the road. Different examples may employ different levels of priority. For example, two priority levels may be used—a high priority and a low priority—though in other examples three or more priority levels may be used. In some examples, a "no priority" level may be used. Such a priority level may be used to exclude access to a particular lane or road for a particular vehicle. Priority for a vehicle may be self-assigned or may be assigned by a lane assignment system. Priority may be based on any number of factors, including a driving mode of the vehicle, a type of vehicle (e.g., car, truck, motorcycle, bicycle, ambulance, police car, etc.), an emergency status of the vehicle (e.g., responding to a fire, responding to an accident, in pursuit of a criminal, etc.), a fuel level, a level of battery charge for an electric vehicle, a route, a destination, a travel purpose (e.g., commercial, leisure, scenic drive, etc.), mechanical issues, or any other factor.

A vehicle's priority may also depend on the available lanes of travel. For example, a vehicle may be assigned multiple priority levels, one for each available lane of travel. Thus, a vehicle travelling on a multi-lane road, may be granted a high priority for a left-hand lane due to its route not requiring any exits or turns, but a low priority for a right-hand lane so that it does not interfere with vehicles that are entering or exiting the roadway. Hence, a vehicle may have a given priority level for each available lane of travel on the road. Also or alternatively, a vehicle's priority level may be general and not specific to any lane of travel on the road.

In addition to priority, this disclosure will refer to a number of different types "driving modes" throughout various examples. Driving modes indicate the manner in which the operator of a vehicle is operating the vehicle. For example, an "autonomous" mode relates to a mode in which the operator allows the vehicle to operate on a road without intervention by the operator. A "semi-autonomous" mode relates to a mode in which the operator may provide some control inputs to operate the vehicle, such as steering inputs or lane change indications, but does not provide other inputs, such as accelerator or braking inputs. A "manual" mode relates to a mode in which the operator is fully in control of the vehicle and provides the inputs needed to operate the car on the road.

Other factors, such as those discussed above, may be employed to determine a priority as well. These other factors may be entirely determinative of a priority, or may simply weigh towards a particular priority level. For example, an "emergency" mode may indicate a vehicle that is operating in response to an emergency condition, such as a fire truck, a police car, or an ambulance. The emergency mode may, on its own, establish a high priority level for a vehicle, or it may be used in conjunction with another factors, such as a driving mode. Some factors may affect a priority more or less depending on various conditions. For example, a vehicle that is on a scenic drive may be assigned a low priority, but upon reaching a scenic area, such as an overlook, it may be assigned a high priority to allow it to move to a lane with a better view of the overlook. Another example is a vehicle that is charging its battery using electronics embedded in a road surface. For example, a road may provide induction coils embedded in its surface that are operable to allow cars equipped with inductive charging capability to charge one or more batteries in the vehicle. The vehicle may be assigned a high priority for the lane that has the charging capability, but otherwise, may only be assigned a medium priority based on other factors.

Further, if a vehicle is not operable, such as a vehicle experiencing engine trouble or a flat tire, it may be assigned a high priority for one or more lanes to enable the vehicle to easily move to the shoulder and come to a safe stop. Similarly, a vehicle experiencing a mechanical problem may be similarly assigned a high priority for a right-hand lane, but a low priority for all other lanes due to its reduced operational state. For example, a vehicle operating with a spare tire may operate in a "mechanical problem" mode, where the vehicle is restricted to speeds under 45 miles per hour. By assigning the vehicle to a high priority for a right lane, but a low priority for other lanes, a lane assignment system may quickly use the priority information to reassign the vehicle to the right lane.

In some examples, priorities assigned based on available lanes may be based on a requirement for use of the lane, or on a preferred driving mode for the lane. For example, if the left lane 410 is assigned as an autonomous mode lane, one or more vehicles in the left lane 410 may operate in a manual mode, but may be assigned a lower priority for the left lane than other vehicles operating in an autonomous mode; however, a lane assignment server may provide a reminder or suggestion to such vehicles to change to a different lane, or may continue to reduce the priority of vehicles operating in the left lane while in a manual mode. In some examples, a lane assignment system may attempt to limit a number of vehicles in the left lane 410 that are not operating in an autonomous mode to, for example, a maximum of 10% of the total number of cars in the left lane 410 over a certain distance, e.g., a half-mile segment of the road 400. Thus, an assigned mode for a particular lane may represent a preference or an operational goal rather than an absolute requirement.

In some examples, the lane records may comprise other or additional information, such as road or lane conditions (e.g., construction, pot holes, debris, water, ice, high-occupancy vehicle lanes), detours, lane closures, or speed limits. In some examples, the data store 484 may comprise a plurality of records per road. For example, a lane assignment system may manage a portion of an interstate highway extending for fifty miles. Over such a distance, the highway may have different numbers of lanes, different speed limits, construction zones, etc. Thus, the lane assignment system 480 may maintain records for different segments of the road.

In some examples, the lane assignment system 480 may access the vehicle and lane information to assign one or more vehicles to a lane of travel on the road based at least in part on the vehicle information and the lane information for roads under the management of the lane assignment system 480.

As used in this specification, "lane information" relates to information describing or associated with a lane for travel on a road. For example, lane information may include physical characteristics of a lane (e.g., length and width); a direction of travel; a driving mode (or modes) assigned to, or allowed in (or preferred in), a lane (e.g., autonomous, manual, emergency, etc.); speed information (e.g., a minimum speed or a speed limit); or lane closure or lane restriction information (e.g., closed, high-occupancy vehicles only, emergency vehicles only, EZ-pass vehicles only); electric charging information (e.g., indicating the presence of charging capabilities, characteristics of the charging capabilities such as wattage or compatibility information). "Vehicle information" relates to information describing or associated with a vehicle on a road, such as physical characteristics (e.g., length, width, height, etc.); driving modes; speed; number of occupants; special access rights (e.g., emergency, government, military, etc.); mechanical issues (e.g., low fuel, flat tire, etc.). Such information may be used by a lane assignment system, or by individual vehicles, to determine lane assignments for one or more vehicles. For example, the following illustrates one example method for autonomous vehicle lane assignment.

Figure 5:
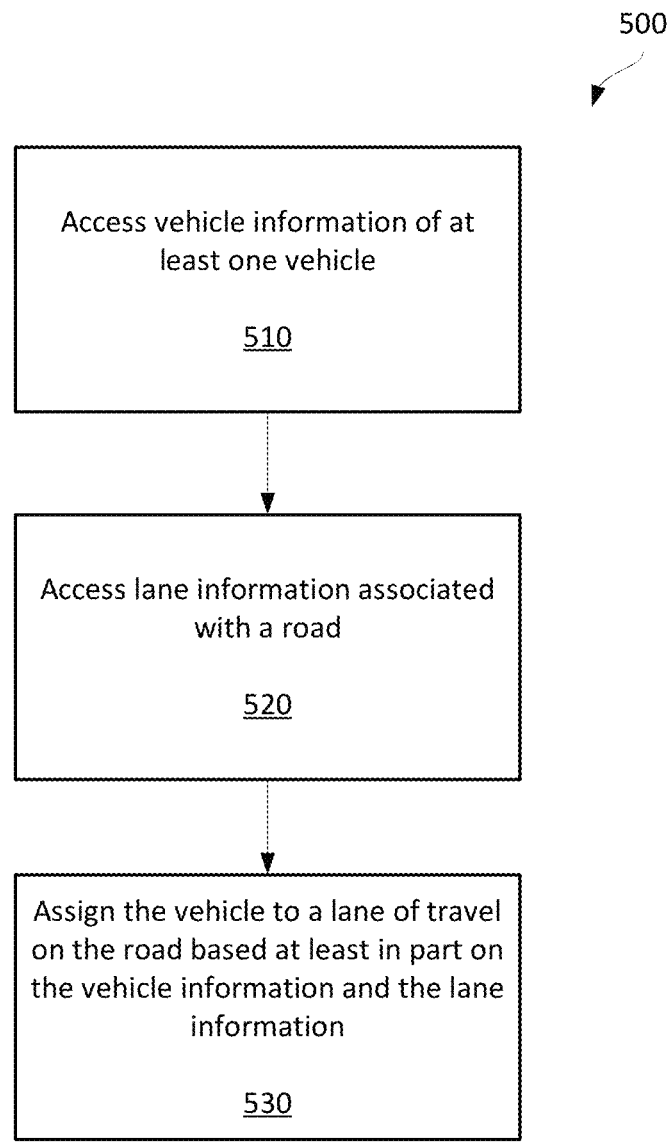
FIGS. 5-6 show example methods for automated lane assignment for vehicles.

Referring now to FIG. 5, FIG. 5 shows an example method 500 for dynamic autonomous vehicle lane assignment for a vehicle. Reference will be made to the lane assignment system 480 of FIG. 4, however, any suitable example system according to this disclosure may be employed.

The method 500 of FIG. 5 begins at block 510 where the lane assignment server 482 accesses vehicle information of at least one vehicle travelling on the road 400, the vehicle information including a priority level of a plurality of priority levels associated with each of the at least one vehicle. As discussed above, the lane assignment system 480 accesses one or more vehicle records from the data store 484, such as based on a particular segment of the road, or based on a request received from a vehicle. For example, the lane assignment server 482 receives a request from a vehicle travelling on the road 400. An example request may comprise a priority level of the vehicle, a driving mode indicating an autonomous driving mode, a location indicating the road 400 of FIG. 4, and a direction of travel indicating a northbound travel direction. In response to the request, the lane assignment server 482 accesses the data store 484 to access information about other vehicles traveling on the road 400 within a threshold range of the requesting vehicle. For example, the lane assignment server 482 requests vehicle records from the data store 484 for vehicles operating in the same direction of travel within 0.1 miles of the requesting vehicle.

In some examples, the lane assignment system 480 may transmit a message to vehicles travelling on the road 400 and request responses from vehicles within 0.1 miles of a particular location, such as the location extracted from the vehicle's lane assignment request, a location of an accident or other emergency, a location of an emergency vehicle (either in transit, or stationary), a location of a construction zone, or others. The lane assignment system 480 may then receive responses from vehicles within the area specified in the transmitted request. It should be noted that a distance of 0.1 miles is simply one example, and other distances may be employed. For example, the lane assignment server 482 may transmit a request for all vehicles within 1 mile of a specified location, such as to enable a smooth transition from a portion of the road having three lanes to a second portion of the road having only two lanes, such as due to changing road widths, accidents, lane closures, construction, etc.

In some examples, emergency vehicles, such as police or fire vehicles or ambulances, may travel on a road while responding to a distress call. An example lane assignment system 480 may receive information from such an emergency vehicle indicating a priority level of the emergency vehicle, a type of emergency vehicle, a destination, a route, and a lane of travel on a road. Such information may be employed to assign the emergency vehicle to a lane of travel, and to assign other vehicles to other lanes on the road instead of assigning the emergency vehicle to varying lanes as it travels through traffic.

Similarly, other vehicles may travel at a high rate of speed, or at a significantly higher rate of speed (e.g., more than 10 miles per hour faster) than other traffic on the road. For example, a toll road may allow for high rates of speed in specified lanes for an increased usage fee, or a road may not be governed by a speed limit, allowing significantly different speeds for different vehicles travelling on the road. In one such example, the faster-moving vehicles may be assigned to a particular lane or lanes and other cars may be temporarily re-assigned to other lanes to allow rapidly approaching vehicles to safely pass. In some such examples, the lane assignment system 480 may receive vehicle information from such a vehicle including a lane of travel on a road and a speed of the vehicle.

In some examples, the lane assignment system 480 may receive one or more requests for specific lane types. For example, an electric vehicle equipped with inductive charging equipment may transmit a request for a lane equipped with inductive charging capabilities. In some examples, the lane assignment system 480 may receive a request from a car on a scenic drive for a lane near a scenic overlook or scenic area.

While the above example describes a response to a request received from a vehicle, in some examples, the lane assignment system 480 may access vehicle information independently of any request from a vehicle. For example, the lane assignment system 480 may access vehicle information associated with a particular location to provide lane assignments based on traffic patterns, accidents, etc.

For example, the lane assignment system 480 may receive a notification of a lane closure, such as due to an accident. The lane assignment server 482 may then access the data store 484 to obtain vehicle information about vehicles approaching the lane closure. In some examples, the lane assignment server 482 may transmit a message to vehicles travelling on the road within a threshold distance of the lane closure and approaching the lane closure to request vehicle information from such vehicles.

In addition to the vehicle information, the lane assignment server may also access lane information before, concurrently with, or after accessing vehicle information.

At block 520, the lane assignment server 482 access lane information associated with a road. In this example, the lane assignment server 482 accesses information for the road associated with the request received from the vehicle. The request included a location and a heading, thus the lane assignment server 482 accesses road information based on the location and accesses lane information associated with the road information based on the heading. For example, a road corresponding to the location may allow for two directions of travel, where each may have different numbers or types of lanes. Thus, the lane assignment server 482 is able to access the lane information most closely associated with the vehicle that transmitted the request.

As discussed above, the lane assignment server 482 may access lane information independently of any received request. For example, the lane assignment server 482 may receive information indicating an accident or increased traffic and may access road or lane information to update such information to determine updated lane assignments for vehicles travelling along the affected portion of the road.

In some examples, the lane assignment server 482 may access lane information indicating lanes having differing speed limits or lane restrictions, such as high-occupancy vehicle lanes, emergency vehicle only lanes, bus or taxi-only lanes, etc. Lane information may also include one or more driving modes, e.g., autonomous or manual, or may include vehicle status information, such as normal status, disabled status, low fuel, mechanical problem, student driver, emergency vehicle, or other information.

In some examples, the lane assignment server 482 may access route information for a vehicle to determine a length of the route and whether ancillary services, such as refueling or charging, may be needed. For example, the lane assignment server 482 may access route information for an electric vehicle and battery charge information for the vehicle. The lane assignment server 482 may determine that the vehicle may require charging to reach the specified destination in the route and access lane information associated with charging capabilities.

At block 530, the lane assignment server 482 assigns the at least one vehicle to a lane of travel on the road based at least in part on the vehicle information and the lane information. For example, the lane assignment server 482 determines that based on the received vehicle information in the request, that based on the priority of the vehicle, the priority of nearby vehicles, the portion of the road 400 traveled by the vehicle, its direction of travel (northbound), and its driving mode (autonomous), and the lane information indicating that lane 410 is dedicated to vehicles travelling in an autonomous driving mode at the vehicle's position, the vehicle's reported driving mode matches the information of lane 410, and so the lane assignment server determines that the vehicle should be assigned to lane 410. The lane assignment server 482 then transmits the assignment to the vehicle via the network 470 and wireless communication node 450.

In some examples, the lane assignment server 482 may determine a lane assignment according to different criteria. For example, with respect to the road 400 of FIG. 4, the requesting vehicle may be operating in an autonomous driving mode, however, it may provide additional information, such as information indicating that the vehicle is operating using a spare tire with a limited maximum speed rating of 55 miles per hour. In such an example, the lane assignment server 482 determines that, despite the vehicle operating in an autonomous driving mode, the vehicle status, e.g., a mechanical issue or a maximum speed rating, better matches with lane 430 of the road 400. In this example, the right lane 430 allows vehicles in an autonomous driving mode, but that have other statuses, such as mechanical issues, or that are following a route that requires exit from (or entry onto) the road 400. Thus, the lane assignment server 482 may both match the reported driving mode with driving modes associated with the lanes 410-430 of the road, and match other status information received from the vehicle with other characteristics of the lanes 410-430 of the road.

In some examples, the lane assignment system 480 may not maintain pre-assigned specific driving modes to lanes, but instead, may dynamically assign vehicles to lanes based on existing traffic conditions and the priorities of vehicles travelling on the road, or segment of the road. For example, at a particular time, a road may have few cars travelling on it. In such an example, the lane assignment system 480 may assign cars operating in an autonomous driving mode to a high priority for a single lane, while assigning a high priority to cars operating in a manual driving mode to all other lanes, but a low priority for the lane having the cars operating in an autonomous driving mode. Or, in some examples, it may only assign a high priority to vehicles operating in a manual driving mode for a particular lane upon receiving vehicle information indicating that the vehicle is approaching, or being approached, by a vehicle operating at a higher priority level due to the other vehicle operating in an automated driving mode so as to avoid interfering with such an autonomous vehicle.

For example, a first vehicle operating at a medium priority in a manual mode may request a lane assignment from the lane assignment system 480. The lane assignment server 482 accesses vehicle and lane information as discussed above. The lane assignment server 482 then determines that only 12 other cars are operating on the road within 0.1 miles of the first vehicle, and assigns the first vehicle to both the left lane 410 and the middle lane 420, thus allowing the driver of the first vehicle to select a desired lane, at which time the driver selects the left lane 410. At a later time, the first vehicle approaches a second vehicle operating in an autonomous driving mode that is also in the left lane 410. The first vehicle may receive information from one or more sensors indicating that it is approaching another vehicle and transmit a request for a lane assignment to the lane assignment system 480. The lane assignment server 482 may determine that, while the conditions are otherwise appropriate to allow the requesting vehicle to be assigned to either the left or middle lanes 410, 420, proximity to the second car operating in a different driving mode results in the first vehicle's priority being overridden with a lower priority, and assigns the first vehicle to the middle lane 420 to avoid interfering with the second vehicle operating in the autonomous driving mode.

Alternatively, the second vehicle may be equipped with one or more sensors that may detect the vehicle approaching from the rear and transmit a request for a lane assignment to the lane assignment system 480. The lane assignment system 480 may then determine that, based on the approaching vehicle operating in the manual driving mode, to provide a temporary reduced priority to the approaching vehicle and to change the lane assignment to the middle lane 420 for the second vehicle to allow the other vehicle to pass without changing the base lane assignment for the second vehicle. The second vehicle may then change lanes, detect when the other vehicle has passed it, transmit a second request to the lane assignment system 480 for a lane assignment, at which time the lane assignment system 480 re-assigns the prior priority to the second vehicle, and re-assigns the second vehicle to the left lane 410.

In one example, the lane assignment system 480 may receive an indication of a lane closure on a section of road. For example, the left lane 410 of the road 400 may be closed due to an accident or construction. The lane assignment server 482 may then periodically transmit requests for vehicle information from any vehicles travelling on road 400 within a threshold distance of the lane closure, e.g., a half mile. Upon receiving response from vehicles to the request, the lane assignment server 482 may confirm, for each vehicle, that the vehicle is appropriate for lane re-assignment, e.g., by determining that the vehicle is travelling in the direction of the lane closure and has not already passed the lane closure, and assign the vehicle to low priority or "no priority" level for the closed lane, and then assign the vehicle to a new lane. In one such example, the lane assignment system 480 may not re-assign every vehicle to a new lane, but may change a priority for a portion of the vehicles travelling in the middle lane 420 and then re-assign them to the right lane 430 to allow vehicles travelling in the left lane 410 to be temporarily assigned a higher priority for the middle lane, and then to assign those vehicles to the middle lane 420 to avoid the lane closure. Subsequent to passing the lane closure, the vehicles may transmit requests to the lane assignment system 480 for a new lane assignment. In some examples, the temporary lane assignment may expire upon passing a particular location, e.g., 250 feet past the end of the lane closure, at which time the prior lane assignment is used by the vehicles without the need for the vehicles to transmit a request to the lane assignment server 482.

As discussed above, emergency vehicles may also be managed by a suitable lane assignment system, such as the example lane assignment system 480 shown in FIG. 4. For example, a police vehicle may be dispatched to assist at an accident on a highway. As the police vehicle enters the highway, it is several miles from the accident, and the lane assignment system 480, based on vehicle information received from the police vehicle, including its destination, and the lane information for the highway, which indicates four traffic lanes, assigns the police vehicle to a high priority for all lanes of traffic, but assigns the police vehicle to the left-most lane of traffic. In addition, the lane assignment system 480 transmits a message to all non-emergency vehicles on the highway between the police vehicle and the accident setting a "no priority" for each vehicle for the left-most lane. Vehicles receiving such a message may automatically assign themselves to a new lane or may transmit a message to the lane assignment system 480 requesting a new lane assignment, at which time, the lane assignment system 480 executes an example method according to this disclosure to assign the requesting vehicles to new lanes of travel. After the police vehicle passes other vehicles, those vehicles may return to their previous lane assignments, or may request a new lane assignment from the lane assignment system.

In another example, as discussed above, an electric vehicle may require or be capable of inductive charging.

Thus, the lane assignment server 482 may assign the vehicle to a lane on a road having electric charging capabilities.

The discussion of the method 500 of FIG. 5 above was made with reference to a lane assignment system 480. However, in some examples, such a lane assignment system 480 may not be available or may not be configured to provide lane assignments in a particular area. In some examples, a vehicle may be configured to determine its own lane of travel irrespective, or in conjunction with, a lane assignment system. Thus, in some examples, individual vehicles may access vehicle and lane information to assign themselves to one or more lanes of travel on a road.

Referring again to FIG. 5, in this example, the discussion of the method 500 of FIG. 5 will be made with reference to the computing device 210 of FIGS. 2 and 3, and road of FIGS. 1A-1B. However, any suitable computing device according to this disclosure may be employed.

At block 510, the computing device 210 of a first vehicle accesses its own vehicle information and determines its operating mode and other characteristics of the vehicle. Based on the vehicle information, the first vehicle determines its own priority level. For example, the computing device 210 determines that the first vehicle is operating in an autonomous driving mode, is following a pre-determined route to a destination, has a "Normal" vehicle status, and is on a leisure drive. Thus, the vehicle assigns itself a "low" priority.

In this example, the vehicle employs one or more sensors 240 to determine vehicles within a threshold range of the first vehicle, e.g., 200 feet. In some examples, the computing device 210 may be configured to transmit a signal configured to be received by suitable computing devices 210 affixed to other vehicles requesting responses from vehicles within the threshold range of the first vehicle and travelling in the same direction as the first vehicle. In some examples, the computing device 210 may transmit directly to other vehicles using a peer-to-peer communication mode, such as a V2V communication mode, or may transmit to other vehicles via a communication network, such as a cellular network, or using a V2X communication mode. The computing device 210 may then receive responses from vehicles that satisfy the request. Such responses may comprise information associated with the responding vehicle, such as priority information, a driving mode, a current lane, an assigned lane, a current speed, a route, a destination, or other information.

In one example, the computing device 210 may receive unsolicited vehicle information from another vehicle or from a lane assignment system 480. For example, an emergency vehicle travelling on the road may directly transmit, or broadcast, a message indicating a lane of travel for the emergency vehicle and the priority level of the vehicle. Such vehicle information may be employed according to example methods for assigning the first vehicle to a lane of travel.

In addition to accessing the vehicle information for the first vehicle and any vehicle information received from other vehicles, the computing device 210 may also access lane information before, concurrently with, or after accessing vehicle information.

At block 520, the computing device 210 of the first vehicle accesses lane information associated with a road, the lane information comprising information corresponding to at least two lanes of travel in a direction. In this example, the computing device 210 accesses lane information from a navigation system of the first vehicle. For example, the navigation system may have, or have access to, map information associated with a plurality of roads, either stored within the navigation system, e.g., on a computer-readable medium, or accessible via a network connection to a map service or a crowdsourcing service, such as via the Internet. In this example, to access the lane information, the computing device 210 transmits a request for lane information to the navigation system, which based on a location of the first vehicle, provides lane information for the road on which the first vehicle is travelling. In some examples, however, the computing device 210 may directly access the lane information, such as by accessing a computer-readable medium having such lane information stored on it, or by accessing a map service or a crowdsourcing service, such as via the Internet. Different types of lane information have been discussed above, and are equally applicable in this example or other examples according to this disclosure.

At block 530, the computing device 210 assigns the first vehicle to a lane of travel on the road based at least in part on the vehicle information and the lane information. In this example, the first vehicle compares a priority of the first vehicle with the priorities of other vehicles based on responses received from the other vehicles. In an example where no other vehicles respond, and no other vehicles are detected based on sensor information received from the sensors 230, 240, the first vehicle assigns itself to a lane based on a pre-determined route. For example, if a pre-determined route indicates that vehicle should follow the road 100 for an extended period of time, e.g., more than 5 miles, the first vehicle assigns itself to a middle lane of the road 100, if there are more than two lanes. If the lane information indicates that there are only two lanes, the first vehicle assigns itself to the right lane, or to otherwise avoid the left-most lane. Such an assignment may be made to allow other vehicles overtaking the first vehicle to pass on the first vehicle's left. If no pre-determined route is engaged, the first vehicle may still assign itself to a middle lane of the road 100, if possible, or to the right-most lane.

If other vehicles are detected by one or more sensors, e.g., sensors 230, 240, but no responses were received by the first vehicle, the first vehicle may re-transmit the request or it may assign itself to a lane based on the current traffic conditions as detected by the sensor(s). For example, if the sensor(s) indicate vehicles located in lanes immediately on either side of the first vehicle, or within a number of feet based on the speed of the first vehicle, e.g., to allow for sufficient braking distance, the computing device 210 may assign the vehicle to its current lane until a different lane is available.

In some examples, the sensor(s) may indicate that the first vehicle is approaching another vehicle at a significant speed differential, e.g., more than 10 miles per hour. In such an example, the computing device 210 may access other sensor information to determine whether adjacent lanes are occupied, as discussed above. If an open lane is detected, the computing device 210 may assign the first vehicle to the free lane, or it may assign the then-current lane and allow the autonomous operating mode of the first vehicle to slow the first vehicle.

If one or more other vehicles respond to the request from the first vehicle, the first vehicle may determine whether any of the responding vehicles is operating at the same priority level as the first vehicle. If one or more other vehicles are operating at the same priority level, the first vehicle determines a lane of travel for each other vehicle, if such information was provided or was detected based on one or more sensor signals. If a majority of the other vehicles having the same priority are in one lane, the computing device 210 assigns the first vehicle to that same lane, and transmits its new assignment to the other vehicles. Such information may be used by the other vehicles to either execute a lane assignment method, such as the example method 500 of FIG. 5, or to request a lane assignment from a lane assignment system, such as the system 480 of FIG. 4. Such a process may cause most or all of the vehicles having the same priority level to migrate to a single lane, which may allow for more efficient use of the lane, and potentially to avoid vehicles operating at a different priority level interfering with each other.

If the computing device 210 receives information from other vehicles indicating that they are each operating in a manual driving mode, the computing device 210 may determine a new priority level for itself, if such information was provided or detected based on one or more sensor signals. The first vehicle then determines a lane having fewest number of vehicles operating in a manual driving mode, and assigns itself a high priority for that lane and a low priority for the other lanes. The first vehicle then assigns itself to that lane. Such an assignment may reduce the likelihood of a manually-operated vehicle from interfering with the operation of the autonomous driving functionality of the first vehicle.

If the computing device 210 receives information from one or more other vehicles indicating a "Mechanical Issue" or similar status, the computing device 210 may determine a lane of travel of such vehicles, if it was provided, and the computing device 210 may assign itself a "no priority" priority level for those lanes, if sufficient remaining lanes are available.

As discussed above, the computing device 210 may receive an unsolicited message from another vehicle indicating that the vehicle is an emergency vehicle having a high priority level. In such an example, the computing device 210 may determine a lane of travel for the emergency vehicle. If such information was provided, and the lane information indicates that the road has multiple lanes of travel, the computing device 210 may assign a "no priority" level to the first vehicle for the lane of travel for the emergency vehicle, and then may assign itself to a lane of travel as far from the lane of the emergency vehicle as permitted. For example, if the sensors 230, 240 do not indicate other vehicles in proximity of the first vehicle, the computing device 210 may immediately assign the first vehicle to a lane of travel at the far left or far right side of the road. If one or more other vehicles are detected, e.g., by the sensors 230, 240 or in response to a request message transmitted by the computing device 210 as discussed above, the computing device 210 may determine whether an adjacent lane may be available. Alternatively, if the first vehicle's lane of travel is already different from the lane of the emergency vehicle, the computing device 210 may maintain the same lane assignment.

At a later time, the computing device 210 determines that the first vehicle's status has changed from "Normal" to a "Low Fuel" status. For example, the first vehicle's autonomous control system has illuminated a light on the console indicating low fuel, and transmitted an indication to the computing device 210 of the new status. The computing device 210 may then execute steps 510 and 520 as discussed above and, based on the accessed vehicle information and the lane information, assign itself a high priority for a right-most lane of travel, which may facilitate exiting the road near a service station. In some examples, the computing device 210 may further transmit a message to one or more other vehicles indicating the "Low Fuel" status and the new lane assignment.

After refueling, the first vehicle may return to the road and assign itself a medium priority level for all lanes, and continue operating in an autonomous driving mode. After a period of time, it may be assigned a high priority level for a lane having a number of other vehicles operating in an autonomous driving mode, as discussed above. However, the driver of the first vehicle elects to change driving modes to a manual driving mode. In response to receiving the selection of the new driving mode, the computing device 210 executes the method 500 of FIG. 5, and assigns itself a low priority level for the lane having the autonomous vehicles, and then, if it is operating in that lane, assigns itself to a new lane of travel.

For example, the computing device 210 may determine, based on responses from other vehicles, lanes of travel associated with other vehicles operating in an autonomous driving mode and assign the first vehicle a low priority level for each of those lanes, but may still assign itself to a lane of travel having the fewest vehicles operating in an autonomous driving mode, or it may instead assign itself to a lane of travel dedicated to vehicles in a manual driving mode based on information obtained from the lane information. At a later time, the driver reengages an autonomous driving mode, and the computing device 210 executes the method of FIG. 5 as discussed above.

Figure 6:
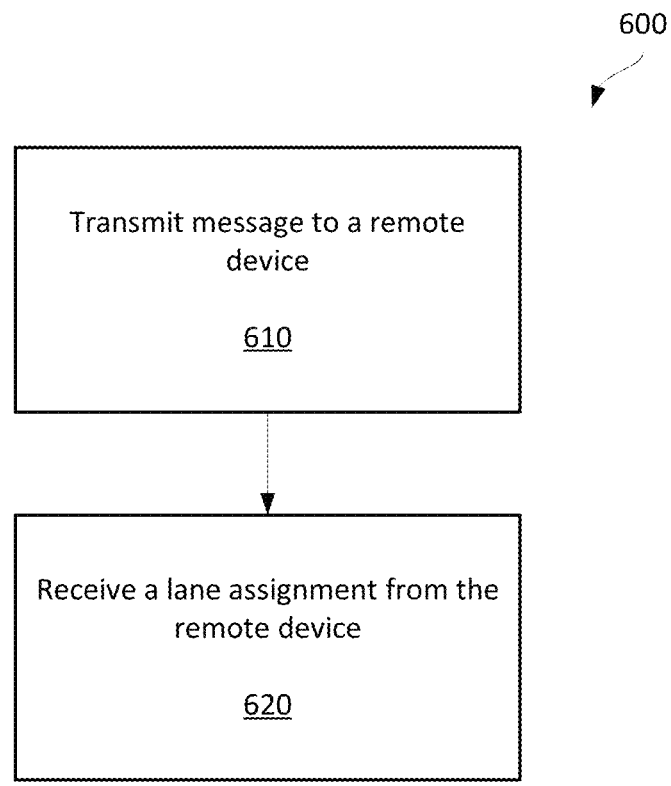

Referring now to FIG. 6, FIG. 6 shows an example method 600 for dynamic autonomous vehicle lane assignment for a vehicle. Reference will be made to the lane assignment system 480 of FIG. 4 and the computing device of FIGS. 2-3, however, any suitable example system or computing device according to this disclosure may be employed.

The method 600 of FIG. 6 begins at block 610 where a vehicle equipped with a computing device 210 transmits a message to a remote device. In this example, the computing device 210 transmits a request for a lane assignment to the lane assignment system 480. In some examples, the request may simply be a bare request for a lane assignment; however, in some examples, the request may include other information, such as priority information, vehicle information, position information, heading information, route information.

In some examples, and in response to the request, the lane assignment system 480 may transmit a request for vehicle information to the vehicle. The request may request any available vehicle information, or may request specific vehicle information, such as priority information or a driving mode of the vehicle. In response to such a request, the computing device 210 transmits a response message to the lane assignment system 480 with the requested information.

At block 620, the computing device 210 receives a lane assignment from the remote device, which is the lane assignment system 480 in this example. The lane assignment may provide an indication of a new lane of travel for the vehicle or an indication to remain in the current lane of travel. In some examples, the lane assignment may indicate additional information, such as lane information for the assigned lane. In some examples, the computing device 210 may compare vehicle information with the received lane information to determine whether the vehicle satisfies one or more lane requirements, such as a minimum speed or a number of occupants. The computing device 210 may then provide an indication to the operator of the vehicle of the new lane assignment, such as by displaying the lane assignment on a heads-up display of the vehicle or by providing an audible of tactile indication of the new lane assignment.

In some examples, the computing device 210 may communicate with a navigation system or autonomous driving system of the vehicle and provide the lane assignment to the navigation or autonomous driving system of the vehicle, and may also provide any received lane information as well. In response to receipt of the lane assignment, the autonomous driving system may cause the vehicle to change to the assigned lane. In addition, the autonomous driving system may change the speed of the vehicle or may change the driving mode of the vehicle based on the lane information. In some examples, the autonomous driving system may reject the lane assignment and may instead maintain the existing lane assignment or change to a different lane.

While the methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

What is claimed is:

1. A method for dynamic vehicle lane assignment for a vehicle, comprising:
   accessing, by a lane assignment server, vehicle information of a plurality of vehicles, wherein the plurality of vehicles are capable of operating in multiple driving modes, the vehicle information including, for a first vehicle and a second vehicle of the plurality of vehicles, a driving mode, comprising an autonomous driving mode, a semi-autonomous driving mode, or a manual driving mode;
   accessing, by the lane assignment server, lane information associated with a road, the lane information comprising information corresponding to at least two lanes of travel in a first direction on the road;
   determining, by the lane assignment server, a first driving mode of the first vehicle and a second driving mode of the second vehicle,
   assigning, by the lane assignment server, the first and second vehicles to a first lane of travel responsive to a determination that the first and second driving modes are the same driving mode; and
   assigning, by the lane assignment server, the first vehicles to a first lane of travel and the second vehicle to a second lane of travel different than the first lane of travel responsive to a determination that the first driving mode being the manual driving mode and the second driving mode being the autonomous driving mode or the semi-autonomous driving mode.

2. The method of claim 1, wherein the vehicle information further includes a priority level, and wherein the priority level is based, at least in part, on the vehicle driving mode, wherein the vehicle driving mode is selected from the group consisting of an autonomous mode, a semi-autonomous mode, and a manual mode.

3. The method of claim 1, wherein the vehicle information further includes a priority level, and wherein the priority level includes a high priority and a lower priority, and wherein the assigning the first and second vehicles to the first or second lanes of travel comprises assigning one of the first or second vehicles to the first lane responsive to the priority level of the respective first or second vehicle being the high priority and assigning the other of the first or second vehicle to the second lane of travel responsive to the priority level being the lower priority.

4. The method of claim 1, wherein assigning the first or second vehicle to the first or second lane is further based on a predetermined route or lane configuration of the road.

5. The method of claim 1, further comprising accessing second vehicle information of the second vehicle, and wherein assigning the first vehicle to the first lane is further based on the second vehicle information.

6. The method of claim 5, wherein the accessing the second vehicle information of the second vehicle comprises receiving the second vehicle information from the second vehicle by the first vehicle.

7. The method of claim 1, further comprising transmitting first vehicle information of the first vehicle to a second vehicle.

8. The method of claim 1, wherein the lane information comprises a driving mode, a direction of travel, a physical characteristic, speed information, lane closure information, lane restriction information, or any combination thereof.

9. The method of claim 1, further comprising providing an indication of the lane assignment to an operator of the first or second vehicle.

10. A non-transitory computer-readable medium comprising program code, the program code configured to be executable by a processor and to cause the processor to:
   access, by a lane assignment server, vehicle information of a plurality of vehicles, wherein the plurality of vehicles are capable of operating in multiple driving modes, the vehicle information including, for a first vehicle and a second vehicle of the plurality of vehicles, a driving mode, comprising an autonomous driving mode, a semi-autonomous driving mode, or a manual driving mode;
   access, by the lane assignment server, lane information associated with a road, the lane information comprising information corresponding to at least two lanes of travel in a first direction on the road;
   determine, by the lane assignment server, a first driving mode of the first vehicle and a second driving mode of the second vehicle,
   assign, by the lane assignment server, the first and second vehicles to a first lane of travel responsive to a determination that the first and second driving modes are the same driving mode; and
   assign, by the lane assignment server, the first vehicle to a first lane of travel and the second vehicle to a second lane of travel different than the first lane of travel responsive to a determination that the first driving mode being the manual driving mode and the second driving mode being the autonomous driving mode or the semi-autonomous driving mode.

11. The computer-readable medium of claim 10, wherein the vehicle information further includes a priority level, and wherein the priority level is based, at least in part, on the driving mode, wherein the driving mode is selected from the group consisting of an autonomous mode, a semi-autonomous mode, and a manual mode.

12. The computer-readable medium of claim 11, wherein the priority level includes a high priority and a lower priority, and wherein the program code configured to be executable by a processor and to cause the processor to assign the first and second vehicles to the first or second lanes of travel comprises program code configured to be executable by a processor and to cause the processor to assign one of the first or second vehicles to the first lane responsive to the priority level of the respective first or second vehicle being the high priority and assign the other of the first or second vehicle to the second lane of travel responsive to the priority level being the lower priority.

13. The computer-readable medium of claim 10, wherein the program code configured to be executable by a processor and to cause the processor to assign the first or second vehicle to the lane of travel is further based on a predetermined route or lane configuration of the road.

14. The computer-readable medium of claim 10, further comprising program code configured to be executable by a processor and to cause the processor to access second vehicle information of the second vehicle, and wherein assigning the first vehicle to the first lane is further based on the second vehicle information.

15. The computer-readable medium of claim 14, wherein the program code configured to be executable by a processor and to cause the processor to access the second vehicle information of the second vehicle comprises program code configured to be executable by a processor and to cause the processor to receive the second vehicle information from the second vehicle by the first vehicle.

16. The computer-readable medium of claim 10, further comprising program code configured to be executable by a processor and to cause the processor to transmit first vehicle information of the first vehicle to a second vehicle.

17. A lane assignment system comprising:
   a non-transitory computer-readable medium; and
   a processor in communication with the non-transitory computer-readable medium and configured to execute program code stored in the non-transitory computer readable medium to:
   access vehicle information of a plurality of vehicles, wherein the plurality of vehicles are capable of operating in multiple driving modes, the vehicle information including, the vehicle information including, for a first vehicle and a second vehicle of the plurality of vehicles, a driving mode, comprising an autonomous driving mode, a semi-autonomous driving mode, or a manual driving mode;
   access lane information associated with a road, the lane information comprising information corresponding to at least two lanes of travel in a first direction on the road;
   determine a first driving mode of the first vehicle and a second driving mode of the second vehicle,
   assign the first and second vehicles to a first lane of travel responsive to a determination that the first and second driving modes are the same driving mode; and
   assign the first vehicle to a first lane of travel and the second vehicle to a second lane of travel different than the first lane of travel responsive to a determination that the first driving mode being the manual driving mode and the second driving mode being the autonomous driving mode or the semi-autonomous driving mode.

18. The system of claim 17, wherein the vehicle information further includes a priority level, and wherein the priority level is based, at least in part, on the driving mode, wherein the driving mode is selected from the group consisting of an autonomous mode, a semi-autonomous mode, and a manual mode.

19. The system of claim 18, wherein the priority level includes a high priority and a lower priority, and wherein the processor is further configured to execute program code stored in the non-transitory computer-readable medium to assign one of the first or second vehicles to the first lane responsive to the priority level of the respective first or second vehicle being the high priority and assign the other of the first or second vehicle to the second lane of travel responsive to the priority level being the lower priority.

20. The system of claim 17, wherein the processor is further configured to execute program code stored in the non-transitory computer-readable medium to cause the processor to assign the first or second vehicle to the lane of travel is further based on a predetermined route or lane configuration of the road.

21. The system of claim 17, wherein the processor is further configured to execute program code stored in the non-transitory computer-readable medium to cause the processor to access second vehicle information of the second vehicle, and assign the first vehicle to the first lane is further based on the second vehicle information.

22. The system of claim 21, wherein the processor is further configured to execute program code stored in the non-transitory computer-readable medium to cause the processor to receive the second vehicle information from the second vehicle by the first vehicle.

23. The system of claim 17, wherein the processor is further configured to execute program code stored in the non-transitory computer-readable medium to cause the processor to transmit first vehicle information of the first vehicle to a second vehicle.

24. A system for dynamic vehicle lane assignment for a vehicle, comprising:
   means for accessing, by a lane assignment server, vehicle information of a plurality of vehicles, wherein the plurality of vehicles are capable of operating in multiple driving modes, the vehicle information including, the vehicle information including, for a first vehicle and a second vehicle of the plurality of vehicles, a driving mode, comprising an autonomous driving mode, a semi-autonomous driving mode, or a manual driving mode;
   means for accessing, by a lane assignment server, lane information associated with a road, the lane information comprising information corresponding to at least two lanes of travel in a first direction on the road;
   means for determining, by a lane assignment server, a first driving mode of the first vehicle and a second driving mode of the second vehicle,
   means for assigning, by a lane assignment server, the first and second vehicles to a first lane of travel responsive to a determination that the first and second driving modes are the same driving mode; and
   means for assigning, by a lane assignment server, the first vehicle to a first lane of travel and the second vehicle to a second lane of travel different than the first lane of travel responsive to a determination that the first driving mode being the manual driving mode and the second driving mode being the autonomous driving mode or the semi-autonomous driving mode.

25. The system of claim 24, wherein the vehicle information further includes a priority level, and wherein the priority level is based, at least in part, on the driving mode, wherein the driving mode is selected from the group consisting of an autonomous mode, a semi-autonomous mode, and a manual mode.

26. The system of claim 25, wherein the priority level includes a high priority and a lower priority, and wherein the means for assigning the first and second vehicles to the first or second lanes of travel comprises means for assigning one of the first or second vehicles to the first lane responsive to the priority level of the respective first or second vehicle being the high priority and assigning the other of the first or second vehicle to the second lane of travel responsive to the priority level being the lower priority.

27. The system of claim 24, wherein the means for assigning the first or second vehicle to the first or second lane is further based on a predetermined route or lane configuration of the road.

28. The system of claim 24, wherein the vehicle is a first vehicle, and further comprising means for accessing second vehicle information of the second vehicle, and wherein the means for assigning the vehicle to the first lane is further configured to assign the first vehicle to the first lane of travel based on the second vehicle information.

29. The system of claim 28, further comprising means for receiving the second vehicle information from the second vehicle by the first vehicle.

30. The system of claim 24, further comprising means for transmitting first vehicle information of the first vehicle to a second vehicle.

* * * * *

UNITED STATES PATENT AND TRADEMARK OFFICE
CERTIFICATE OF CORRECTION

PATENT NO. : 10,309,789 B2
APPLICATION NO. : 15/081665
DATED : June 4, 2019
INVENTOR(S) : Bala Ramasamy It is certified that error appears in the above-identified patent and that said Letters Patent is hereby corrected as shown below:

In the Claims

In Column 20, Lines 22-23, in Claim 17, after "the vehicle information including," delete "the vehicle information including,".

In Column 21, Lines 18-19, in Claim 24, after "the vehicle information including," delete "the vehicle information including,".

Signed and Sealed this
Twenty-seventh Day of August, 2019

Andrei Iancu
*Director of the United States Patent and Trademark Office*